United States Patent
Ju

(10) Patent No.: US 9,299,129 B2
(45) Date of Patent: Mar. 29, 2016

(54) METHOD AND APPARATUS FOR REMOVING SHADOW FROM AERIAL OR SATELLITE PHOTOGRAPH

(71) Applicant: HYUNDAI MNSOFT, Inc., Seoul (KR)

(72) Inventor: Chanjin Ju, Seoul (KR)

(73) Assignee: HYUNDAI MNSOFT, INC., Seoul (KR)

( * ) Notice: Subject to any disclaimer, the term of this patent is extended or adjusted under 35 U.S.C. 154(b) by 96 days.

(21) Appl. No.: 14/065,886

(22) Filed: Oct. 29, 2013

(65) Prior Publication Data

US 2014/0294232 A1    Oct. 2, 2014

(30) Foreign Application Priority Data

Mar. 29, 2013  (KR) .......................... 10-2013-0034639

(51) Int. Cl.
*G06K 9/00* (2006.01)
*G06T 5/00* (2006.01)
*G06T 5/50* (2006.01)

(52) U.S. Cl.
CPC .............. *G06T 5/001* (2013.01); *G06K 9/0063* (2013.01); *G06T 5/005* (2013.01); *G06T 5/008* (2013.01); *G06T 5/50* (2013.01); *G06T 2207/10032* (2013.01); *G06T 2207/20221* (2013.01); *G06T 2207/30184* (2013.01)

(58) Field of Classification Search
None
See application file for complete search history.

(56) References Cited

U.S. PATENT DOCUMENTS

| | | | |
|---|---|---|---|
| 6,532,022 B1* | 3/2003 | Ahmad | 345/629 |
| 2002/0123841 A1* | 9/2002 | Satoh et al. | 701/208 |
| 2006/0274917 A1* | 12/2006 | Ng et al. | 382/103 |
| 2008/0317375 A1* | 12/2008 | Huan et al. | 382/274 |
| 2011/0292208 A1* | 12/2011 | Zhou et al. | 348/144 |
| 2012/0219218 A1* | 8/2012 | Demandolx | 382/168 |
| 2013/0216089 A1* | 8/2013 | Chen et al. | 382/100 |

FOREIGN PATENT DOCUMENTS

KR    10-2012-0086892    8/2012

OTHER PUBLICATIONS

Guo et al, Single-Image Shadow Detection and Removal using Paired Regions, Computer Vision and Pattern Recognition (CVPR), 2011 IEEE Conference, pp. 2033-2040.*

* cited by examiner

*Primary Examiner* — Weiwen Yang
(74) *Attorney, Agent, or Firm* — Bacon & Thomas, PLLC

(57) ABSTRACT

A method for removing a shadow from an aerial or satellite photograph, includes collecting aerial or satellite photographs, by the photographing information collecting unit; extracting buildings at each of the collected aerial or satellite photographs, by the building information extracting unit; and estimating a shadow area cast by the extracted buildings, by the shadow area estimating unit. Further, the method includes restoring a shaded image in the aerial or satellite photograph, which corresponds to the estimated shadow area, by the image restoration unit; and composing the restored image and a residual image of the aerial or satellite photograph except the shadow area, by the image composition unit.

12 Claims, 5 Drawing Sheets

METHOD AND APPARATUS FOR REMOVING SHADOW FROM AERIAL OR SATELLITE PHOTOGRAPH

CROSS-REFERENCE TO RELATED APPLICATION(S)

The present invention claims priority of Korean Patent Application No. 10-2013-0034639, filed on Mar. 29, 2013, which is incorporated herein by reference.

FIELD OF THE INVENTION

The present invention relates to a shadow removal method and apparatus from an aerial or satellite photograph; and more particularly, to a method and apparatus for removing a shadow cast by buildings from an aerial or satellite photograph to improve visibility of the aerial or satellite photograph.

BACKGROUND OF THE INVENTION

As known in the art, aerial or satellite photographs refer to any photographs of the ground or objects taken from any one elevated position in the air and include air photographs of the ground taken from an aircraft or the like in flight and artificial satellite photographs of the ground taken from the air by artificial satellites.

The aerial or satellite photographs may be categorized into vertical photographs and oblique photographs. The vertical photographs may be used in areas of expertise such as a photo survey, photo-interpretation, topographic map manufacture, etc., and the oblique photographs may be used for a news photo, aerial view, etc.

On the other hand, typical navigation systems mounted on, e.g., a vehicle or a smart phone, capture their current locations based on location information of the vehicles received through GPS (Global Positioning System) satellites, read data of a current location from a road database which is built in the navigation systems or received from the outside, and display a currently driving road together with the location of the vehicles, thereby helping a driver to identify the location of the road or to find a destination with ease when driving on the first trip.

In order to satisfy user needs, recently, a navigation system provides to a user more precise route information through advanced technologies, which are integrated into the navigation system, such as informing expected arrival time from a starting point to a destination and suggesting a detour depending on a road situation to the destination, when the user sets the destination.

Moreover, in recent years, other technologies have been studied and developed to display a currently driving location of a vehicle on an image of an aerial or satellite photograph instead of a road map derived from a road map database and guide a more realistic route to a driver.

However, such a technology had been developed up to a just level that aerial or satellite photographs are continually received and the position of the vehicle is displayed on an image of the received aerial or satellite photograph. If there is a shadow cast by a structure such as a building in an aerial or satellite photograph when the aerial or satellite photograph is acquired, a driver has to identify his/her route from the image of the aerial or satellite photograph with the shadow, which results in deteriorating the visibility of the driver.

Related art of the disclosure of the present invention is disclosed in Korean Laid-Open patent No. 10-2012-0086892, entitled "SYSTEM AND METHOD FOR WARNING A LANE DEPARTURE OF A VEHICLE NAVIGATION DEVICE," published on Aug. 6, 2012, which is incorporated by reference herein in its entirety.

SUMMARY OF THE INVENTION

In view of the above, the present invention provides a method and apparatus for removing a shadow from an aerial or satellite photograph, which is capable of estimating a shape of the shadow cast by a building in the aerial or satellite photograph to remove the shadow and rendering a shadow-free image of the aerial or satellite photograph to be displayed, improving visibility of the aerial or satellite photograph.

In accordance with a first aspect of the present invention, there is provided a method for removing a shadow from an aerial or satellite photograph, the method being performed by a shadow removal apparatus, which includes a photographing information collecting unit, a building information extracting unit, a shadow area estimating unit, an image restoration unit, and an image composition unit. The method includes collecting aerial or satellite photographs, by the photographing information collecting unit; extracting buildings at each of the collected aerial or satellite photographs, by the building information extracting unit; estimating a shadow area cast by the extracted buildings, by the shadow area estimating unit; restoring a shaded image in the aerial or satellite photograph, which corresponds to the estimated shadow area, by the image restoration unit; and composing the restored image and a residual image of the aerial or satellite photograph except the shadow area, by the image composition unit.

Further, the photographing information collecting unit may be further configured to acquire information including at least one of a photographing location, a flight height and a photographing time of the aerial or satellite photograph, and an angle of view of a photographing equipment, when it collects the aerial or satellite photograph.

Further, the building information extracting unit may be further configured to choose buildings among the extracted buildings that are taller than or equal to a preset standard height, when it extracts buildings in the collected aerial or satellite photograph.

Further, the estimating the shadow area cast by the extracted buildings may comprise estimating a shape of the shadow area based on the photographing time of the aerial or satellite photograph and a floor surface shape and height of the extracted buildings; and extracting a boundary of the shape of the estimated shadow area.

Further, the estimating a shape of the shadow area may comprise estimating an orientation and size of the shadow to be cast.

Further, the restoring a shaded image in the collected aerial or satellite photograph, which corresponds to the estimated shadow area may comprise changing brightness and contrast between light and darkness of the shaded image itself in the aerial or satellite photograph, which corresponds to the estimated shadow area to thereby restore the shaded image in the aerial or satellite photograph.

Further, the restoring a shaded image in the collected aerial or satellite photograph, which corresponds to the estimated shadow, may comprise extracting a un-shaded image, which matches the estimated shadow area, from another aerial or satellite photograph that is taken at a different photographing time and substituting the shaded image with the extracted un-shaded image, to thereby restore the shaded image in the aerial or satellite photograph.

Further, the restoring a shaded image in the aerial or satellite photograph, which corresponds to the shadow area, may comprise extracting a un-shaded image, which matches a boundary area of the estimated shadow area, from another aerial or satellite photograph that is taken at a different photographing time; and substituting the shaded image with the extracted un-shaded image, to thereby restore the shaded image in the aerial or satellite photograph.

In accordance with a second aspect of the present invention, there is provided an apparatus for removing a shadow from an aerial or satellite photograph. The apparatus includes a photographing information collecting unit configured to collect aerial or satellite photographs; a building information extracting unit configured to extract buildings in each of the collected aerial or satellite photographs; a shadow area estimating unit configured to estimate a shaded area cast by the extracted buildings; an image restoration unit configured to restore a shaded image in the aerial or satellite photograph, which corresponds to the estimated shadow area; and an image composition unit configured to compose the restored image and a residual image of the aerial or satellite photograph except the shadow area.

Further, the photographing information collecting unit may be further configured to collect information including at least one of a photographing location, a flight height and photographing time of the aerial or satellite photograph, and an angle of view of a photographing equipment.

Further, the building information extracting unit may be further configured to choose buildings among the extracted buildings that are taller than or equal to a preset standard height.

Further, the shadow area estimating unit may comprise a shape estimator configured to estimate a shape of the shadow area based on the photographing time of the aerial or satellite photograph and a floor surface shape and a height of the extracted buildings; and a boundary extractor configured to extract a boundary of the shape of the estimated shadow area.

Further, the shape estimator may be configured to estimate an orientation and size of the shadow to be cast.

Further, the image restoration unit may be configured to change brightness and contrast between light and darkness of the shaded image itself in the aerial or satellite photograph, which corresponds to the estimated shadow area, thereby restoring the shaded image in the aerial or satellite photograph.

Further, the image restoration unit may be configured to extract a un-shaded image, which matches the estimated shadow area, from another aerial or satellite photograph that is taken at a different photographing time and substitute the shaded image with the extracted un-shaded image, thereby restoring the shaded image in the aerial or satellite photograph.

Further, the image restoration unit may be configured to extract a un-shaded image, which matches a boundary area of the estimated shadow area, from another aerial or satellite photograph that is taken at a different photographing time; and substitute the shaded image with the extracted un-shaded image, thereby restoring the shaded image in the aerial or satellite photograph.

As described above, the embodiment of the present invention removes a shadow from the aerial or satellite photograph and displays an image of a shadow-free aerial or satellite photograph, which improves image quality.

Further, the embodiment of the present invention guides a route to the destination through the aerial or satellite photograph with a high visibility image when guiding the route using the aerial or satellite photograph, which results in increasing the convenience of a user.

BRIEF DESCRIPTION OF THE DRAWINGS

The above and other objects and features of the present invention will become apparent from the following description of the embodiments given in conjunction with the accompanying drawings, in which.

DETAILED DESCRIPTION OF THE EMBODIMENTS

Figure 1:
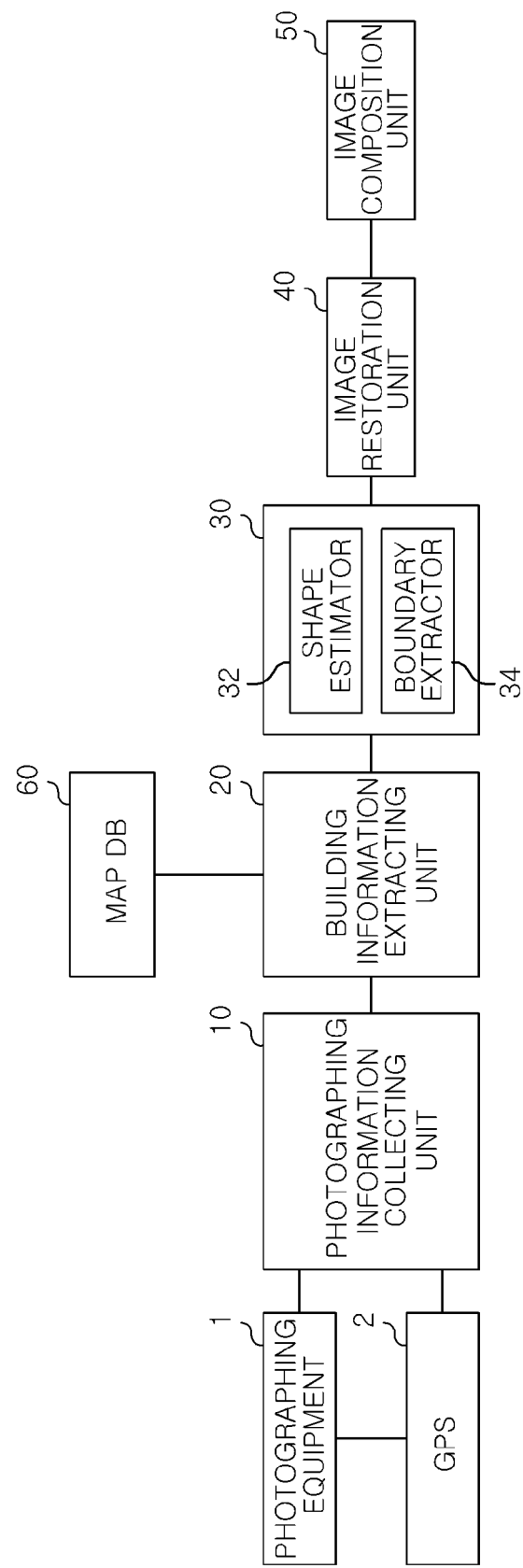
FIG. 1 is a functional block diagram of an apparatus for removing a shadow from an aerial or satellite photograph in accordance with an embodiment of the present invention.

Hereinafter, a route guiding apparatus, a route guiding server and a route guiding method in accordance with an embodiment of the present invention will be described in detail with reference to the accompanying drawings. In the drawings, thickness of lines and size of components shown in the drawings may be exaggerated for the purpose of descriptive clarity and for the sake of convenience. Further, the following terms are defined in consideration of the functions of the present invention, which may vary depending on intensions of a user or an operator or practices. Therefore, the definition of such terms should be made on the basis of the disclosure throughout the present specification.

FIG. 1 is a functional block diagram of an apparatus for removing a shadow from an aerial or satellite photograph in accordance with an embodiment of the present invention.

Referring to FIG. 1, the apparatus for removing a shadow from an aerial or satellite photograph includes a photographing information collecting unit 10, a building information extracting unit 200, a shadow area estimating unit 30, an image restoration unit 40, an image composition unit 50 and a map database (DB) 60.

The photographing information collecting unit 10 continually collects aerial or satellite photographs of the ground taken from the air and additionally acquires photographing information such as a photographing location, a flight height and a photographing time at which the respective aerial or satellite photographs have been taken.

To accomplish it, the photographing information collecting unit 10 may be configured to include a communication unit for communicating with a photographing equipment 1 such as an aircraft or artificial satellites (not shown) having cameras mounted thereon.

To be more concrete, the photographing information collecting unit 10 is able to collect a desired aerial or satellite photograph of the ground in a different way of receiving the aerial or satellite photograph from the photographing equipment 1 in real time or of receiving the aerial or satellite photograph, which has been captured and stored in advance, from the photographing equipment 1.

In particular, the photographing information collecting unit 10 collects not only the aerial or satellite photographs, but also information about the photographing location and flight height at that time each of the aerial or satellite photograph is taken from a GPS (Global Positioning System) 2, which will be used to derive a photographed region for the collected aerial or satellite photograph from a map database 60.

In other words, the photographing information collecting unit 10 can determine whether an aerial or satellite photograph of which ground is taken on a basis of the photographing location and flight height information containing the longitude and latitude at which the aerial or satellite photograph has been captured.

Further, in this embodiment, when collecting the aerial or satellite photographs supplied from the photographing equipment 1, the photographing information collecting unit 10 acquires information about a photographing time at which the aerial or satellite photograph is captured along with the aerial or satellite photograph.

In addition, the photographing information collecting unit 10 collects information about an angle of view of the photographing equipment 1 to take the aerial or satellite photograph. This is because that a photography capability including the angle of view may be different between various photographing equipment 1. Therefore, the shadow removal apparatus of the present embodiment may more correctly derive from the map database 60 a region of which the aerial or satellite photograph is intended to capture based on the angle of view of the photographing equipment 1.

The building information extracting unit 20 extracts information about a plurality of buildings in the aerial or satellite photograph that is collected by the photographing information collecting unit 10.

More specifically, the building information extracting unit 20 can extract information about the buildings on the ground in an aerial or satellite photograph from the map database 60 which stores a map image including an image of a region intended to be taken as the aerial or satellite photograph and a floor surface shape and a height of buildings within the region.

In this case, the map database 60 may be incorporated in the building information extracting unit 20 or contained in an external storage device such as a separate server outside of the building information extraction unit 20. When the map database 60 is placed on the external storage device, the building information extracting unit 20 may receive the map database 60 by way of communication with the external storage device.

As such, the building information extracting unit 20 extracts a plurality of the buildings, e.g., in the form of a list, on the ground in the aerial or satellite photograph. Of note, in accordance with the embodiment, the building information extracting unit 20 may choose only some buildings, which are taller than or equal to a preset standard height, among the plurality of the buildings.

The "preset standard height" used herein refers to the height of a building enough to cast a shadow, which may have an effect on a visibility of an image, for example, a height corresponding to the five-floor building but not limited thereto. The standard height may be differently set depending on condition(s) such as a photographing angle by the photographing equipment 1, a solar altitude, and/or the like.

As a result, in this embodiment, it is possible to speed up an image processing by choosing only the information about the buildings with an amount of the standard height affecting the identification of an image and removing a shadow cast by the chosen buildings.

The shadow area estimating unit 30 estimates an area of a shadow cast by the buildings that have been chosen through the building information extracting unit 20.

In order to estimate the shadow area, the shadow area estimating unit 30 includes a shape estimator 32 and a boundary extractor 34. The shape estimator 32 serves to estimate a shape of the shadow area based on a photographing time of the aerial or satellite photograph and a floor surface shape and height of the chosen buildings, and the boundary extractor 34 serves to extract a boundary from the shape of the estimated shadow.

More specifically, the shape estimator 32 is able to estimate the altitude of the sun based on the photographing time of the aerial or satellite photograph and estimate the shape of the shadow cast by the chosen buildings based on the floor surface shape and height information of the chosen buildings. Consequently, it is possible to estimate an orientation and size of the shadow to be cast.

Because there is a difference in light and darkness between a shaded image and a non-shaded image, the boundary extraction unit 34 may extract a boundary of the shadow area that is estimated by the shape estimator 32 by comparing the light and darkness between the shadow area and a residual area except the shadow area in the aerial or satellite photograph.

An image processing method that compares the difference in the light and darkness between images and extracts the boundary is well known in the art. Therefore, a detailed description thereof will be omitted for the sake of simplicity.

Meanwhile, the image restoration unit 40 restores a shaded image corresponding to the shadow area in the aerial or satellite photograph which is estimated by the shadow area estimating unit 30.

More specifically, the image restoration unit 40 restores the shaded image in the aerial or satellite photograph corresponding to the estimated shadow area by changing brightness and contrast between light and darkness of the shaded image itself, or extracting a un-shaded image, which matches the estimated shadow area, from another aerial or satellite photograph of the same scene that is taken at a different photographing time and substituting the shaded image with the extracted un-shaded image from the another aerial or satellite photograph.

First, in a way of changing the brightness and the contrast between light and darkness of the shaded image itself to restore the shaded image in the aerial or satellite photograph, the image restoration unit 40 performs an image processing to extract a boundary of an object such as a building or a structure in the aerial or satellite photograph and then compares the brightness and the contrast between light and darkness within an image of the object.

Thereafter, the image restoration unit 40 decides that the object cast a shadow when a difference of the brightness or the contrast in the image of the same object is above a preset threshold and then adjusts the brightness or the contrast of the shaded image corresponding to the estimated shadow area on a basis of the difference of the brightness or the contrast of the object, thereby restoring the shaded image in the aerial or satellite photograph.

Second, in a way of extracting an un-shaded image, which matches the estimated shadow area, from another aerial or satellite photograph that was taken at a different photographing time and substituting the shaded image with the extracted un-shaded image, the image restoration unit 40 may employ a technique, e.g., such as a HDR (High Dynamic Range) to compose differently exposed pictures of the same scene.

Especially, the embodiment uses a change in an orientation of the shadows with a variation of the photographing times. In this case, the image restoration unit 40 extracts a un-shaded image, which matches the estimated shadow area in the aerial or satellite photograph that has been collected by the photographing information collecting unit 10, from another aerial or satellite photograph that is taken at a photographing time different from that of the aerial or satellite photograph and substituting the shaded image corresponding to the estimated shadow area with the extracted un-shaded image, thereby restoring the shaded image in the aerial or satellite photograph.

The image composition unit 50 composes the image restored by the image restoration unit 40 and a residual image in the aerial or satellite photograph from which the shaded image of the shadow area was extracted, thereby creating a full image of a shadow-free aerial or satellite photograph.

Hereinafter, the shadow removal method from an aerial or satellite photograph will be described in detail with reference to FIG. 2 to FIG. 5.

Figure 2:
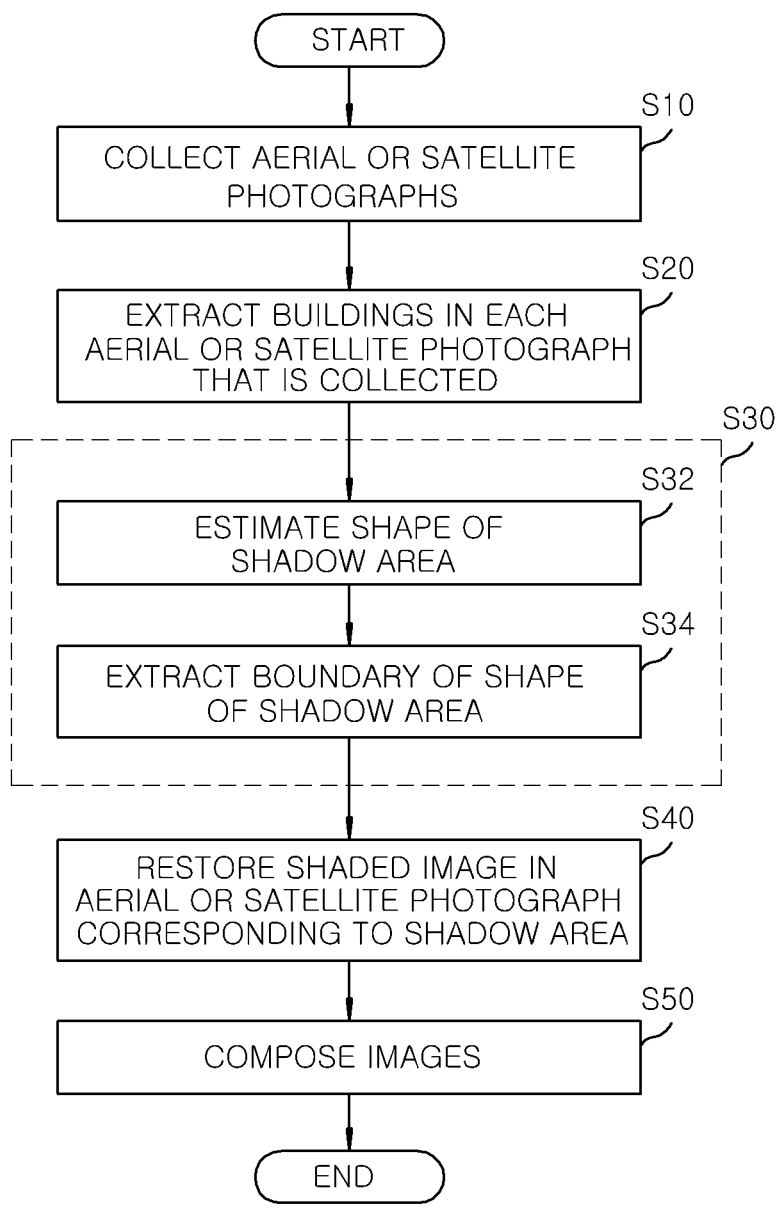
FIG. 2 is a flow chart illustrating a method for removing a shadow from an aerial or satellite photograph in accordance with an embodiment of the present invention.
Figure 3:
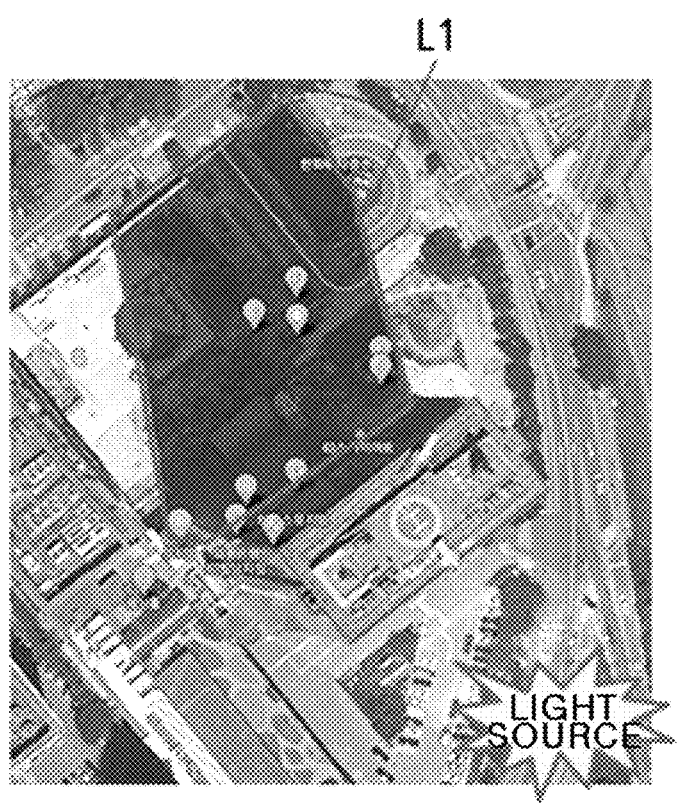
FIG. 3 illustrates an aerial or satellite photograph having a shadow area which is estimated on a basis of the shadow removal method in accordance with an embodiment of the present invention.
Figure 4:
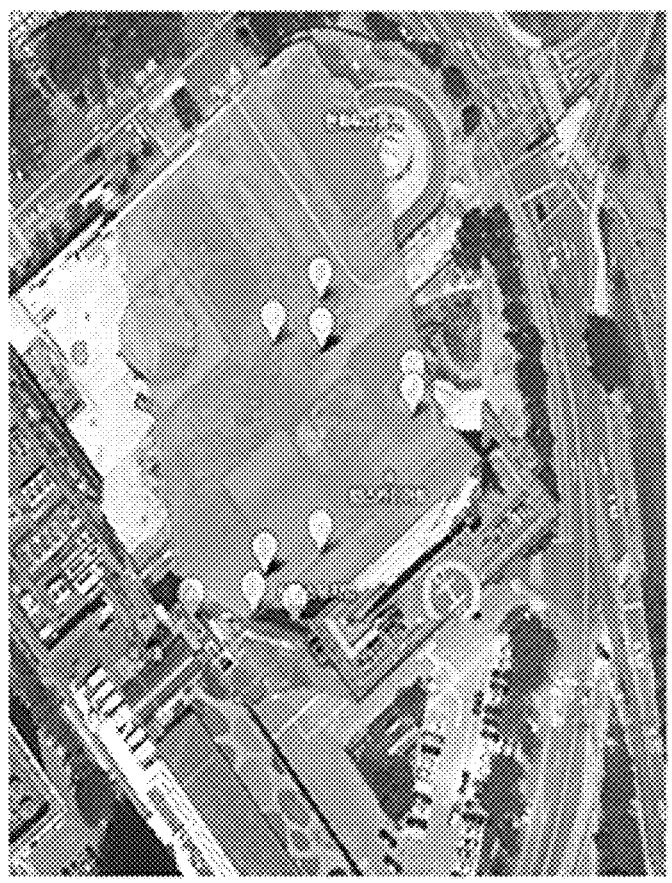
FIG. 4 illustrates an aerial or satellite photograph having a restored image, which corresponds to the estimated shadow area shown in FIG. 3, in accordance with an embodiment of the present invention.
Figure 5:
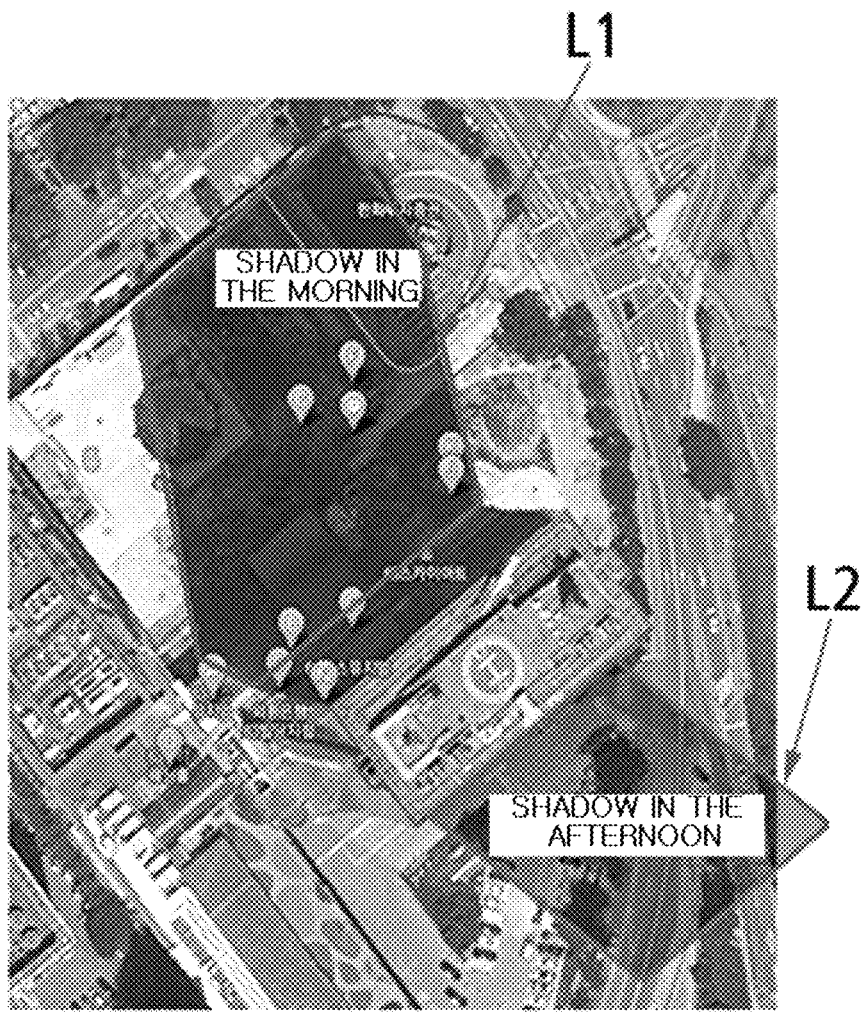
FIG. 5 illustrates an aerial or satellite photograph in which two shadow areas, which are different on the variation of photographing time, are depicted for the purpose of the comparison between them.

FIG. 2 is a flow chart illustrating a method for removing a shadow from an aerial or satellite photograph in accordance with an embodiment of the present invention; FIG. 3 illustrates an aerial or satellite photograph having a shadow area which is estimated on a basis of the shadow removal method in accordance with an embodiment of the present invention; FIG. 4 illustrates an aerial or satellite photograph having a restored image, which corresponds to the estimated shadow area shown in FIG. 3, in accordance with an embodiment of the present invention; and FIG. 5 illustrates an aerial or satellite photograph in which two shadow areas, which are different on the variation of photographing time, are depicted for the purpose of the comparison between them.

Referring to FIG. 2 to FIG. 5, first, the photographing information collecting unit 10 continually collects aerial or satellite photographs of the ground from a photographing equipment 1 such as an artificial satellite or aircraft in an operation S10.

In this case, the photographing information collecting unit 10 acquires photographing information including a photographing location, a flight height, a photographing time, and an angle of view of the photographing equipment 1, as well as the aerial or satellite photographs of the ground.

The building information extraction unit 20 extracts buildings in each of the aerial or satellite photographs that are collected by the photographing information collecting unit 10 in operation S20. More specifically, the building information extracting unit 20 extracts a list of the buildings on the ground in the aerial or satellite photograph based on the map database 60. Particularly, the building information extracting unit 20 may choose only buildings that are taller than or equal to a preset standard height among the list of the buildings in the aerial or satellite photograph.

As mentioned above, the standard height means the height of the building height enough to cast shadows, which may affect the identification of an image, and may be configured to be different depending on condition(s) such as a photographing angle by the photographing equipment 1, a solar altitude, and/or the like.

Thereafter, the shadow area estimating unit 30 estimates an area of the shadow produced by the buildings that have been chosen through the building information extracting unit 20 in an operation S30.

Referring to FIG. 3, the operation of estimating the shadow area in the aerial or satellite photograph through the shadow area estimating unit 30 includes an operation S32 of estimating a shape of the shadow area based on a photographing time of the aerial or satellite photograph and a floor surface shape and a height of the buildings through the use of the shape estimator 32; and an operation S34 of extracting a boundary from the shape of the estimated shadow area through the use of the boundary extractor 34.

In other words, the shape estimator 32 is able to estimate the altitude of the sun based on the photographing time of the aerial or satellite photograph and estimate the shape of the shadow area produced by the chosen buildings based on the floor surface shape and height information of the chosen buildings, thereby estimating an orientation and size of the shadow area to be produced.

Based on a concept that there is a difference in light and darkness between a shaded image and a non-shaded image, the boundary extraction unit 34 compares the shape of the shadow area, which is estimated by the shape estimator 32 and a residual area except the shadow area, so that a boundary L1 of the estimated shadow shape can be extracted as shown in FIG. 3.

Subsequently, the image restoration unit 40 restores a shaded image corresponding to the shape of the shadow area which is estimated by the shadow area estimating unit 30 in an operation S40.

More specifically, the image restoration unit 40 restores the shaded image in the aerial or satellite photograph corresponding to the estimated shadow area by changing brightness and contrast between light and darkness of the shaded image itself or extracting an un-shaded image, which matches the estimated shadow area, from another aerial or satellite photograph of the same scene that was taken at a different photographing time and substituting the shaded image with the extracted un-shaded image from the another aerial or satellite photograph.

First, the approach of changing the brightness and the contrast between light and darkness of the shaded image itself to restore the shaded image in the aerial or satellite photograph extracts a boundary of an object such as a building or a structure in the aerial or satellite photograph and then compares the brightness and the contrast between light and darkness within an image of the object.

Thereafter, the image restoration unit 40 determines that the shadow was cast by the object if there is a difference of the brightness or the contrast in the image of the same object over a preset threshold and then adjusts the brightness or the contrast of the shaded image corresponding to the estimated shadow area on a basis of the difference of the brightness or the contrast of the object, thereby restoring the shaded image in the aerial or satellite photograph as illustrated in FIG. 4.

Second, the approach of extracting an un-shaded image, which matches the estimated shadow area, from another aerial or satellite photograph that was taken at a different photographing time and substituting the shaded image with the extracted image is performed by utilizing a concept of the change in the orientation of the shadow which may vary from one photographing time to another.

As depicted in FIG. 5, even though the same scene has been captured, the location of the sun may vary with the photographing times. Thus, it can be observed from FIG. 5 that a boundary L1 of a shadow in the aerial or satellite photograph taken in the morning is different from a boundary L2 of a shadow in the same aerial or satellite photograph taken in the afternoon.

Accordingly, in order to remove the shadow area shown in FIG. 3 and then restore a shaded image, which corresponds to the shadow area, within the boundary L1 in the aerial or satellite photograph, the image restoration unit 40 extracts an un-shaded image, which matches the shadow area having the boundary L1, from the aerial or satellite photograph of the same scene taken in the afternoon and substitutes the shaded image with the extracted un-shaded image. As a result, the shaded image in the aerial or satellite photograph can be restored.

Finally, the image composition unit 50 composes the restored image and a residual image of the aerial or satellite photograph except of the shadow area to produce a full image of the aerial or satellite photograph with a shadow removed in an operation S50.

In accordance with the embodiment, a shadow is removed from an aerial or satellite photograph and a shadow-free image of the aerial or satellite photograph is displayed, therefore, the improvement of an image quality can be achieved.

Further, when guiding the route to a destination of a vehicle using the aerial or satellite photograph, the aerial or satellite photograph with a high visibility image is used to guide the route, which increases the convenience of a user.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A method for removing a shadow from an aerial or satellite photograph, the method being performed by a shadow removal apparatus implemented by a processor, which includes a photographing information collecting unit, a building information extracting unit, a shadow area estimating unit, an image restoration unit, and an image composition unit, the method comprising:
    collecting through the photographing information collecting unit aerial or satellite photographs taken by and received from a photographing equipment;
    extracting buildings at each of the collected aerial or satellite photographs, by the building information extracting unit;
    estimating a shadow area cast by the extracted buildings, by the shadow area estimating unit;
    restoring a shaded image in the aerial or satellite photograph, which corresponds to the estimated shadow area, by the image restoration unit; and
    composing the restored image and a residual image of the aerial or satellite photograph except the shadow area, by the image composition unit,
    wherein the photographing information collecting unit is further configured to acquire information including at least one of a photographing location, a flight height and a photographing time for said each of the aerial or satellite photographs, and an angle of view of the photographing equipment when the photographing equipment takes said each of the aerial or satellite photographs, and
    wherein the building information extracting unit is further configured to extract the buildings that are taller than or equal to a preset standard height, when it extracts buildings in said each of the collected aerial or satellite photographs, the preset standard height having a different value according to the angle of view of the photographing equipment and the photographing time.

2. The method of claim 1, wherein said estimating the shadow area cast by the extracted buildings comprises:
    estimating a shape of the shadow area based on the photographing time of the aerial or satellite photograph and a floor surface shape and height of the extracted buildings; and
    extracting a boundary of the shape of the estimated shadow area.

3. The method of claim 2, wherein said estimating a shape of the shadow area comprises estimating an orientation and size of the shadow to be cast.

4. The method of claim 1, wherein said restoring a shaded image in the collected aerial or satellite photograph, which corresponds to the estimated shadow area comprises changing brightness and contrast between light and darkness of the shaded image itself in the aerial or satellite photograph, which corresponds to the estimated shadow area to thereby restore the shaded image in the aerial or satellite photograph.

5. The method of claim 1, wherein said restoring a shaded image in the collected aerial or satellite photograph, which corresponds to the estimated shadow, comprises:
    extracting a un-shaded image, which matches the estimated shadow area, from another aerial or satellite photograph that is taken at a different photographing time and substituting the shaded image with the extracted un-shaded image, to thereby restore the shaded image in the aerial or satellite photograph.

6. The method of claim 5, wherein said restoring a shaded image in the aerial or satellite photograph, which corresponds to the shadow area, comprises:
    extracting a un-shaded image, which matches a boundary area of the estimated shadow area, from another aerial or satellite photograph that is taken at a different photographing time; and
    substituting the shaded image with the extracted un-shaded image, to thereby restore the shaded image in the aerial or satellite photograph.

7. An apparatus for removing a shadow from an aerial or satellite photograph, the apparatus comprising at least a processor implementing:
    a photographing information collecting unit configured to collect aerial or satellite photographs taken by and received from a photographing equipment;
    a building information extracting unit configured to extract buildings in each of the collected aerial or satellite photographs;
    a shadow area estimating unit configured to estimate a shaded area cast by the extracted buildings;
    an image restoration unit configured to restore a shaded image in the aerial or satellite photograph, which corresponds to the estimated shadow area; and
    an image composition unit configured to compose the restored image and a residual image of the aerial or satellite photograph except the shadow area,
    wherein the photographing information collecting unit is further configured to acquire information including at least one of a photographing location, a flight height and a photographing time for said each of the aerial or satellite photographs, and an angle of view of the photographing equipment when the photographing equipment takes said each of the aerial or satellite photographs, and
    wherein the building information extracting unit is further configured to extract the buildings that are taller than or equal to a preset standard height having a different value according to the angle of view of the photographing equipment and the photographing time.

8. The apparatus of claim 7, wherein the shadow area estimating unit comprises:

a shape estimator configured to estimate a shape of the shadow area based on the photographing time of the aerial or satellite photograph and a floor surface shape and a height of the extracted buildings; and a boundary extractor configured to extract a boundary of the shape of the estimated shadow area.

9. The apparatus of claim 8, wherein the shape estimator is configured to estimate an orientation and size of the shadow to be cast.

10. The apparatus of claim 7, wherein the image restoration unit is configured to:

change brightness and contrast between light and darkness of the shaded image itself in the aerial or satellite photograph, which corresponds to the estimated shadow area, thereby restoring the shaded image in the aerial or satellite photograph.

11. The apparatus of claim 7, wherein the image restoration unit is configured to:

extract a un-shaded image, which matches the estimated shadow area, from another aerial or satellite photograph that is taken at a different photographing time and substitute the shaded image with the extracted un-shaded image, thereby restoring the shaded image in the aerial or satellite photograph.

12. The apparatus of claim 11, wherein the image restoration unit is configured to:

extract a un-shaded image, which matches a boundary area of the estimated shadow area, from another aerial or satellite photograph that is taken at a different photographing time; and substitute the shaded image with the extracted un-shaded image, thereby restoring the shaded image in the aerial or satellite photograph.

* * * * *